Patented Sept. 14, 1937

2,093,100

UNITED STATES PATENT OFFICE 2,093,100

PROCESS FOR THE PURIFICATION OF SYNTHETIC CAMPHOR

Franco Santarelli, Milan, Italy, assignor to "Montecatini" Società Generale per l'Industria Mineraria ed Agricola, Milan, Italy No Drawing. Application July 7, 1936, Serial No. 89,476. In Italy July 15, 1935

2 Claims. (Cl. 260—133)

By means of the normal industrial processes for the synthesis of camphor, an ordinary quality of sufficient purity for most applications is prepared. This product, however, is not sufficiently pure for pharmaceutical applications, inasmuch as it still contains small quantities of borneol and of compounds of the pinene group, which should be eliminated. The presence of these impurities is usually made evident indirectly by the melting point; whilst pure camphor has a melting point of 176° C., ordinary camphor has a lower one, which is usually about 145° C.

The processes proposed heretofore for the purification of ordinary camphor are of a physical or chemical kind: to the first belong the processes based on sublimation, on fractional condensation and on crystallization from aromatic solvents; to the second belong the processes using nitric acid as solvent for the impurities. Whilst the latter give no satisfactory results, those of a physical kind reach their aim, but only after costly and repeated operations.

The process developed by the applicant succeeds, instead, in transforming, by means of a simple and economical operation, the camphor having a melting-point of 145° C. into camphor having a melting-point very near to that of pure camphor.

The method is based on the fact that glacial acetic acid dissolves the camphor, while it reacts (a) with the pinene and the other compounds of the pinene group; (b) with the camphene and the other compounds of the camphene group; according to the following reactions, respectively:—

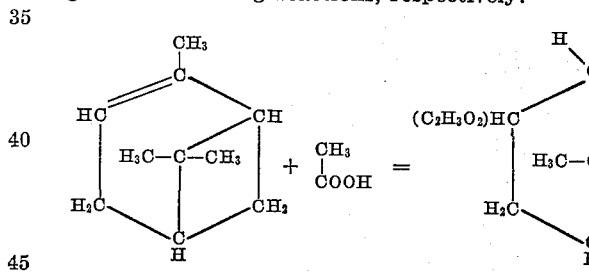

Pinene    Acetic acid    Pinene acetate

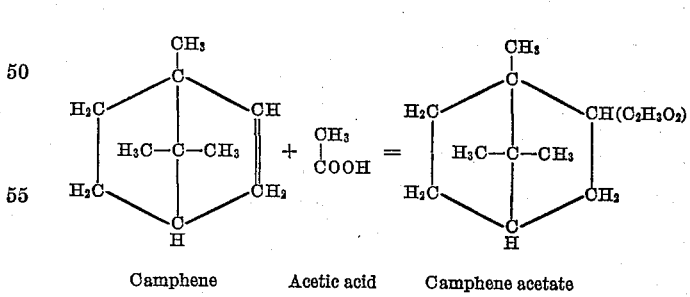

Camphene    Acetic acid    Camphene acetate

Camphor, however, is not soluble in diluted acetic acid, and advantage is taken of this property for its separation from impurities. In fact, if the product to be purified be treated with glacial acetic acid and the solution thus obtained be successively diluted, the camphor precipitates whilst the acetates which have formed with the impurities remain in solution.

The process may be carried out in the following manner:

Ordinary camphor is put into a vessel containing glacial acetic acid (grade 99%), preferably stirring in order to increase the rate of operation, until a saturated solution is obtained; water is added until the acetic acid concentration reaches about 25%; the complete precipitation of the camphor present is thus obtained. The precipitate is separated from the solution, by decantation, and is dried. From the residual liquor in the vessel containing the esterified impurities, the free acetic acid is easily separated by evaporation, so that it can return to the cycle; the loss of acid is therefore but little higher than the quantity necessary to esterify the impurities, all the more if the vessel be supplied with a tight-fitting cover.

The process can thus transform, by a single operation, ordinary camphor into pure camphor; it may also, however, be advantageously applied to the camphor obtained from other methods of treatment; thus, for instance, it has been ascertained that camphor already partially purified by crystallization, with a melting-point of 160° C., can easily be transformed, by the above treatment, into camphor having a melting-point of 172° C.; it has also been ascertained that, by the same treatment, very impure camphor residues may be raised from a melting-point of 132° C. to a melting-point of 155° C.

This process may be advantageously applied to practically any type of impure synthetic camphor, eliminating a substantial part of the impurities, in a much more simple and complete manner than the processes known heretofore.

Having now particularly described and ascertained the nature of my said invention, and in what manner the same is to be performed, I declare that what I claim is:

1. The process for the purification of synthetic camphor, which comprises dissolving the camphor to be purified in concentrated acetic acid, and diluting the solution thus obtained to a concentration at which the camphor precipitates and the impurities esterified by the acetic acid remain dissolved.

2. The process for the purification of synthetic camphor, which comprises dissolving the camphor to be purified in concentrated acetic acid, diluting the solution thus obtained to a concentration at which the camphor precipitates and the impurities esterified by the acetic acid remain dissolved, and evaporating the solution containing the esterified impurities, after separation of the camphor, in order to recover the free acetic acid.

FRANCO SANTARELLI.